(No Model.)
2 Sheets—Sheet 1.
W. B. WOODS.
TROLLEY REPAIR WAGON.
No. 578,848. Patented Mar. 16, 1897.
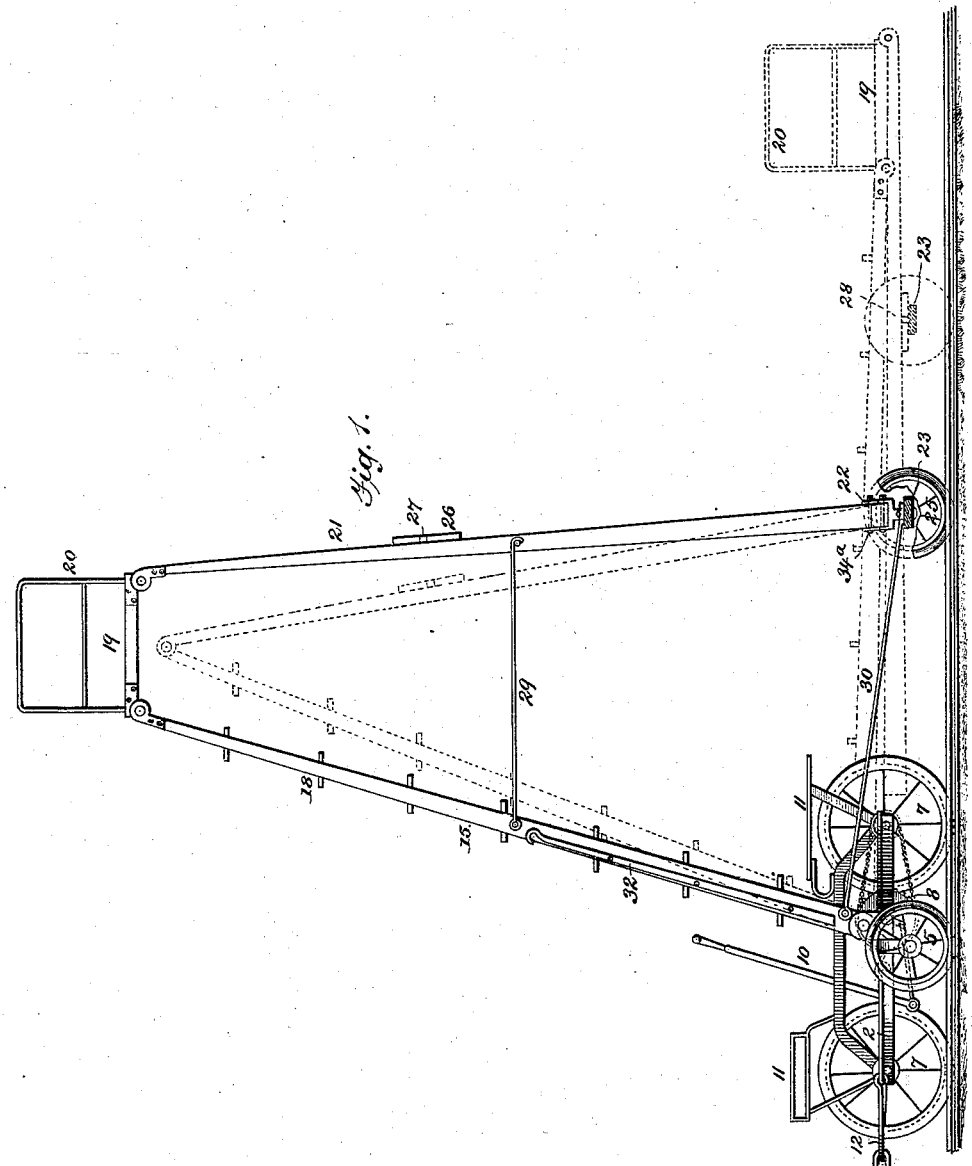
WITNESSES:
J. E. Luckett
Geo. Wallace
INVENTOR
W. B. Woods
BY
Fred G. Dieterich & Co.
ATTORNEYS

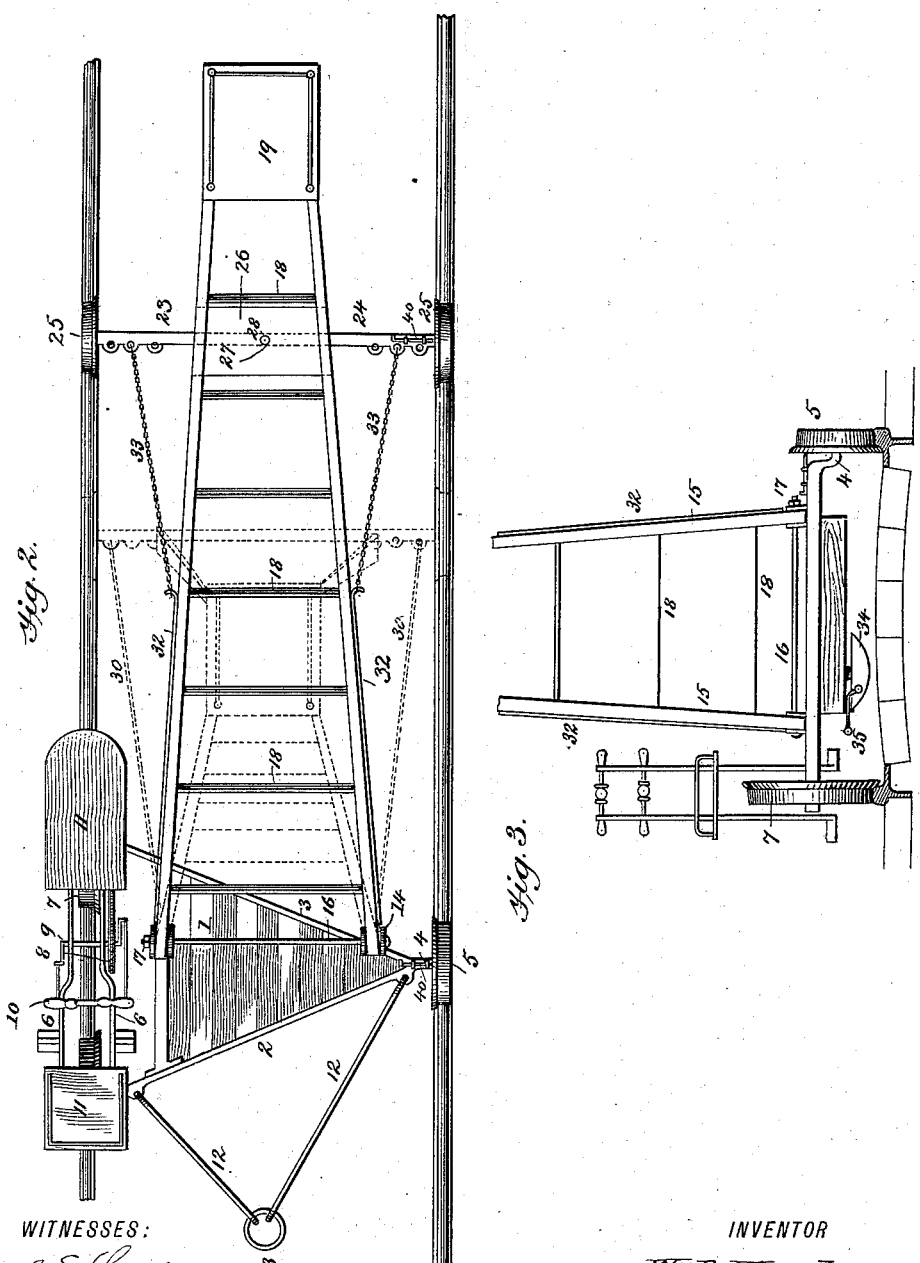

UNITED STATES PATENT OFFICE.

WILLIAM B. WOODS, OF WHEELING, WEST VIRGINIA.

TROLLEY REPAIR-WAGON.

SPECIFICATION forming part of Letters Patent No. 578,848, dated March 16, 1897.

Application filed November 3, 1896. Serial No. 610,957. (No model.)

*To all whom it may concern:*

Be it known that I, WILLIAM B. WOODS, residing at Wheeling, in the county of Ohio and State of West Virginia, have invented a new and Improved Trolley Repair-Wagon, of which the following is a specification.

My invention relates to improvements in repair wagons or carriages for use in connection with overhead electric railways; and it has for its object, primarily, to provide a mechanism of this character of a very simple and inexpensive structure which can be easily drawn along on the track, easily manipulated, and which will effectively serve for its intended purposes.

My invention also has for its object to provide a repair-wagon of this kind having the carriage or motive power so arranged as to be readily operated by hand or to be attached to a car, it also having the platform or supporting members arranged to be quickly and conveniently elevated or lowered, as conditions may require.

With other objects in view my invention consists in the peculiar combination and novel arrangement of parts, such as will hereinafter be first described in detail, and then be specifically pointed out in the appended claims, reference being had to the accompanying drawings, in which—

Figure 1 is a side elevation of my improved repair-wagon, the platform and supporting-frame being shown in the lower position in dotted lines. Fig. 2 is a top plan view of the same, the platform-supporting frame being shown to its lowered position in full lines and to its elevated position in dotted lines. Fig. 3 is a detail end view thereof.

Referring now to the accompanying drawings, in which like numerals indicate like parts in all the views, 1 indicates a platform formed of the cross members 2 and 3, connected at one end, as at 4, to form a bearing for the single supporting-wheel 5 and diverging in the opposite direction and connected with the frame 6, in which are mounted the supporting or drive wheels 7, the rear one of which is geared with a sprocket-wheel 8 on a suitable crank-shaft 9, having hand-operated lever mechanism 10, as shown, such platform and supporting-wheels and gearing being in the nature of a railway-bicycle mechanism, the frame 6 having seat portions 11, as shown.

At the front end the platform has draft-rods 12, joined by a clevis or ring member 13, whereby the said platform or drive mechanism can be readily connected to a car. The platform 1 has bearing members 14, in which the lower end of the front supporting-bars 15 are detachably and pivotally connected by means of the cross-bolt 16 and nut 17.

The bars 15 have cross members 18, which form the ladder portion, and the upper ends of such bars 15 are pivotally connected to a platform 19, having suitable guards 20.

The rear ends of the platform 19 are pivotally connected to a pair of rear supporting-bars 21, the lower ends of which are detachably connected to bifurcated members 22, secured at suitable points to the cross-bar or axle 23 of the slidable truck 24, such axle having supporting-wheels 25, preferably of a diameter that of the front wheel 5.

At a point about midway the length thereof the bars 21 are joined by a cross-piece 26, having a socket or aperture 27, which is adapted to receive a stud-pin 28 on the cross member or axle 23 of a sliding truck when the said bars are to their lowered position, as indicated in dotted lines in Fig. 1, such stud 28 serving to hold the supporting-frame from lateral movement and the truck from longitudinal movement when the said parts are in position to be transported along the line.

29 indicates brace-rods which serve to connect the members 15 and 21, and 30 indicates similar rods which connect the supporting members 15 with the cross-axle 23 when the parts are to their elevated or operative position, and thereby serve to render them strong and avoid danger of collapsing.

32 indicates hook-bars secured to the lower ends of the members 15, to which, when the parts are in their lowered positions, chains 33 are attached, which are also connected to the cross-bar 23 when the sliding truck is to its extended position, and in addition to the stud 28 serves to hold the said truck to its proper adjusted position.

So far as described it will be readily seen that in transportation the supporting-platform and supports therefor can be conveniently carried along on the track, as the sliding truck serves as a convenient support therefor, it being also understood that to place the platform in position it is only necessary to elevate the members 15 and 21 and connect the members 21 to the bifurcated supports 22 by the bolt-and-nut connections 34ª, the sliding truck being pushed forward to a proper position and held by means of the stay bars or rods 30.

Instead of joining the supports 15 and 21 to a platform they may be pivotally connected with each other, as indicated in dotted lines in Fig. 1, the ladder forming in this instance the entire supporting means for the operator.

34 indicates a gong secured to the front platform 1, having its trip member 35 arranged in convenient reach of the foot of one of the operators. By connecting the end of the ladder-frame to the main platform or truck by a long bolt it is obvious that by removing such bolt the bicycle or truck frame will be freed entirely from the sliding truck, the ladder, and supporting-frame, and be used independent thereof for carrying grease or other materials necessary in the repair or adjustment of curves and other portions of the road-bed.

Upon the front and rear truck-frames are supported at suitable points slide-bolts 40, which, when the ladder-frame is raised, are capable of being slid out between the spokes of one of the wheels in each truck-frame to hold the wheels from revolving.

Slight changes in the details of construction may be made without departing from the scope of the appended claims, it being obvious that, if desired, the front or truck platform may have a motor for operating the drive mechanism which can take its power from the trolley and thereby avoiding the necessity of hand-operated means, it being also understood that when hand-operated means are employed the drive-gearing need not be in the nature of chain-and-sprocket devices, but of such arrangement as conditions may make most desirable.

From the foregoing description, taken in connection with the accompanying drawings, it is thought the complete operation and advantages of my invention will be readily apparent. The same, while being of a very simple and economical construction, has the several parts so arranged as to be of ample strength to support the operator and such tools and other equipments necessary for the operator to have within convenient reach.

The supporting-frame can be quickly lowered by simply removing the bolts 34ª and disconnecting the stay-rods 30 from the sliding truck-axle 23.

Having thus described my invention, what I claim, and desire to secure by Letters Patent, is—

1. A trolley repair-wagon, comprising a front truck-frame, an independent adjustable rear truck-frame, a ladder pivotally connected at the lower end to the front truck, a rear supporting-frame pivotally connected at its upper end to the ladder-frame to fold thereunder when the said ladder-frame is lowered, and having its lower end detachably connected to the rear truck, and means for holding the folded ladder and supporting-frame and the rear truck in a locked connection when such ladder and supporting-frames are lowered thereon substantially as shown and described.

2. In a mechanism of the character described, the combination with the front or carrier truck and the adjustable rear truck, of the ladder-supports 15, the rear supports 21, the platform 19 having pivotal connection with the supports 15 and 21, said supports 15 and 21 having means for detachably connecting them with the front and rear trucks respectively, and stay-chains for holding the rear truck to its adjusted position substantially as shown and described.

3. In a mechanism as described the combination with the front supporting-truck, the ladder-frame pivotally connected at the lower end to the front truck, the adjustable rear truck having a stud member 28, of the rear supports detachably connected at the lower ends to the adjustable truck, a cross member 26 having an opening 27, said rear supports having pivotal connections with the front or ladder frame, and means for holding the rear truck to its adjusted position substantially as shown and described.

4. A trolley repair-wagon comprising a front or carrier truck and an independent adjustable rear truck, a front ladder-frame pivotally connected at the lower end to the front truck, a rear supporting-frame detachably connected at the lower end to the rear truck, a supporting-platform having pivotal connections with the upper ends of the ladder and rear supporting-frame, stay-rod 30, hook-rods 32, and the chain connection all being arranged substantially as shown and for the purposes hereinbefore described.

WILLIAM B. WOODS.

Witnesses:
W. A. SHIRLEY,
C. L. HAMILTON.